(12) United States Patent
Scott et al.

(10) Patent No.: US 9,165,307 B2
(45) Date of Patent: Oct. 20, 2015

(54) SYSTEM, METHOD AND COMPUTER PROGRAM PRODUCT FOR TEMPLATED EXPORT OF CONTENT

(75) Inventors: Michael Scott, Washington Grove, MD (US); Tom Trainer, Bethesda, MD (US); Guy Hellier, Catawba, VA (US)

(73) Assignee: Open Text S.A., Luxembourg, Grand Duchy of Luxembourg (LU)

( * ) Notice: Subject to any disclaimer, the term of this patent is extended or adjusted under 35 U.S.C. 154(b) by 855 days.

(21) Appl. No.: 13/433,672

(22) Filed: Mar. 29, 2012

(65) Prior Publication Data

US 2014/0181240 A1 Jun. 26, 2014

Related U.S. Application Data (60) Provisional application No. 61/469,025, filed on Mar. 29, 2011.

(51) Int. Cl.
*G06F 15/16* (2006.01)
*G06Q 30/02* (2012.01)
*H04L 29/08* (2006.01)
*G06F 17/30* (2006.01)
*G06Q 10/10* (2012.01)

(52) U.S. Cl.
CPC .............. *G06Q 30/02* (2013.01); *G06F 17/30* (2013.01); *G06Q 10/10* (2013.01); *H04L 67/06* (2013.01)

(58) Field of Classification Search
CPC ........................................ G06F 3/048
USPC ................................. 709/206, 217
See application file for complete search history.

(56) References Cited

U.S. PATENT DOCUMENTS

2011/0219322 A1* 9/2011 Ramamurthy et al. ....... 715/764

* cited by examiner

*Primary Examiner* — Glenford Madamba
(74) *Attorney, Agent, or Firm* — Sprinkle IP Law Group (57) ABSTRACT

Embodiments disclosed herein provide systems and methods for a templated export. In one embodiment, a method may include determining an export template responsive to a first user action, the first user action indicating a delivery endpoint. The method may further include preparing an asset for delivery to the delivery endpoint utilizing the export template. The asset may include zero or more files. The export template may include predetermined configuration and delivery parameters particular to the delivery endpoint. The prepared asset may be communicated to the delivery endpoint without any further user action.

20 Claims, 3 Drawing Sheets

☐ Export  400

| Items | Options | Conversions |

You are exporting 6 items, with total size of 12.5 MB.

Item

CMI0003460-0.jpg (2 MB)  ☑ include original file in export

Convert using [ Alchemy  ◇ ]

410

Delivery Template: [ FTP and notify        ◇ ]

● Server:              [                    ]
● User:                [                    ]
● Password:            [                    ]
● Destination folder:  [ /                  ]
● From:                [ ttrainer@opentext.com ]
● To:                  [                    ]
● Subject line:        [ Content sent from Media Manager. ]
● Message body:        [ Please find the attached content. ]

*FIG. 4*

SYSTEM, METHOD AND COMPUTER PROGRAM PRODUCT FOR TEMPLATED EXPORT OF CONTENT

CROSS-REFERENCE TO RELATED APPLICATION(S)

This application claims a benefit of the filing date of U.S. Provisional Application No. 61/469,025, filed Mar. 29, 2011, entitled "SYSTEM, METHOD AND COMPUTER PROGRAM PRODUCT FOR TEMPLATED EXPORT OF CONTENT," which is incorporated herein by reference in its entirety.

TECHNICAL FIELD

This disclosure relates generally to digital asset management. More particularly, embodiments disclosed herein relate to a system, method, and computer program product implementing template based functionality for exporting content.

BACKGROUND

The internet has changed a user's expectation of technology, and has introduced concepts and changes on how users collaborate, communicate and share information. While digital media management technologies were once used exclusively by publishing and media companies, they are increasingly being incorporated into content management systems to manage other digital assets such as photos, music, videos, animations, podcasts and other multimedia content. In this regard, the term 'digital asset management' (DAM) generally refers to a business process or a software tool for organizing the creation, management, distribution and archiving of digital assets.

To a certain degree, DAM systems can simplify the process of creating, managing, and distributing rich media for web, print, broadcast, and other online marketing and content distribution channels. Users of DAM systems still must deal with disparate configurations, parameters, processes, requirements, etc. of different web, print, broadcast, and other online marketing and content distribution channels. Worse yet, these configurations, parameters, processes, requirements, etc. may change dynamically, sometimes without notice. Consequently, particularly for large entities, a significant amount of time, efforts, and resources, may be wasted in simply trying to catch up with the changing needs in distributing rich media to over communications networks and channels.

Advances in information technology continue to bring challenges to business operations management. Consequently, there is always room for innovations and improvements.

SUMMARY OF THE DISCLOSURE

Embodiments disclosed herein provide a template-based approach for exporting content to various delivery endpoints. These delivery endpoints may have different requirements as to how content, including, but not limited to, video content, should be prepared, packaged and delivered for publication.

In some embodiments, an authorized user or system administrator may define at least one custom export template for a delivery endpoint. An export template thus defined may include file preparation parameters and/or delivery parameters particular to the delivery endpoint. In some embodiments, an export template is made available to end users via a user interface (UI) with file preparation parameters and/or delivery parameters automatically populated.

For example, an end user in a production environment may select, from a set of export templates, a specific template for exporting content to a particular distribution channel, which, in one embodiment exemplifies a delivery endpoint. File handling parameters and delivery parameters within an export template associated with a particular delivery endpoint may process, package and deliver an asset particular to a delivery endpoint. Thus, a user does not have to know what the processing, packaging and delivery details are for any particular delivery endpoint. The user simply indicates that content has to be sent to a particular delivery endpoint. This may greatly reduce the time and efforts usually involved in exporting content via prior methodologies.

Embodiments disclosed herein provide systems and methods for a templated export. In one embodiment, a method may include determining at least one template responsive to a first user action, the first user action indicating at least one delivery endpoint. The method may further include preparing an asset for delivery to the at least one delivery endpoint utilizing the at least one template, wherein the template includes delivery parameters associated with the at least one delivery endpoint. Additionally, the method may include communicating the asset to the at least one delivery endpoint based at least in part on the delivery parameters.

In a further embodiment, the template is determined from a plurality of templates, each of the plurality of templates corresponding to one of the at least one delivery endpoint.

In another embodiment, the at least one template comprises a file handling template and a delivery template.

In a further embodiment, the file handling template is configured to prepare the asset particular to the at least one delivery endpoint.

In another embodiment, the delivery template is configured to prepare the delivery parameters of the asset particular to the at least one delivery endpoint.

In an embodiment, the communicating includes transmitting the asset to at least one delivery endpoint utilizing a plurality of parameters specified in the template.

In another embodiment, the communicating the asset to the at least one delivery endpoint is performed without a further user action configuring the template.

A further embodiment may include determining if the template includes a file handling template, and if the template does not include the file handling template presenting at least one file handling parameter to the user.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION OF THE DRAWINGS

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices.

Figure 1:
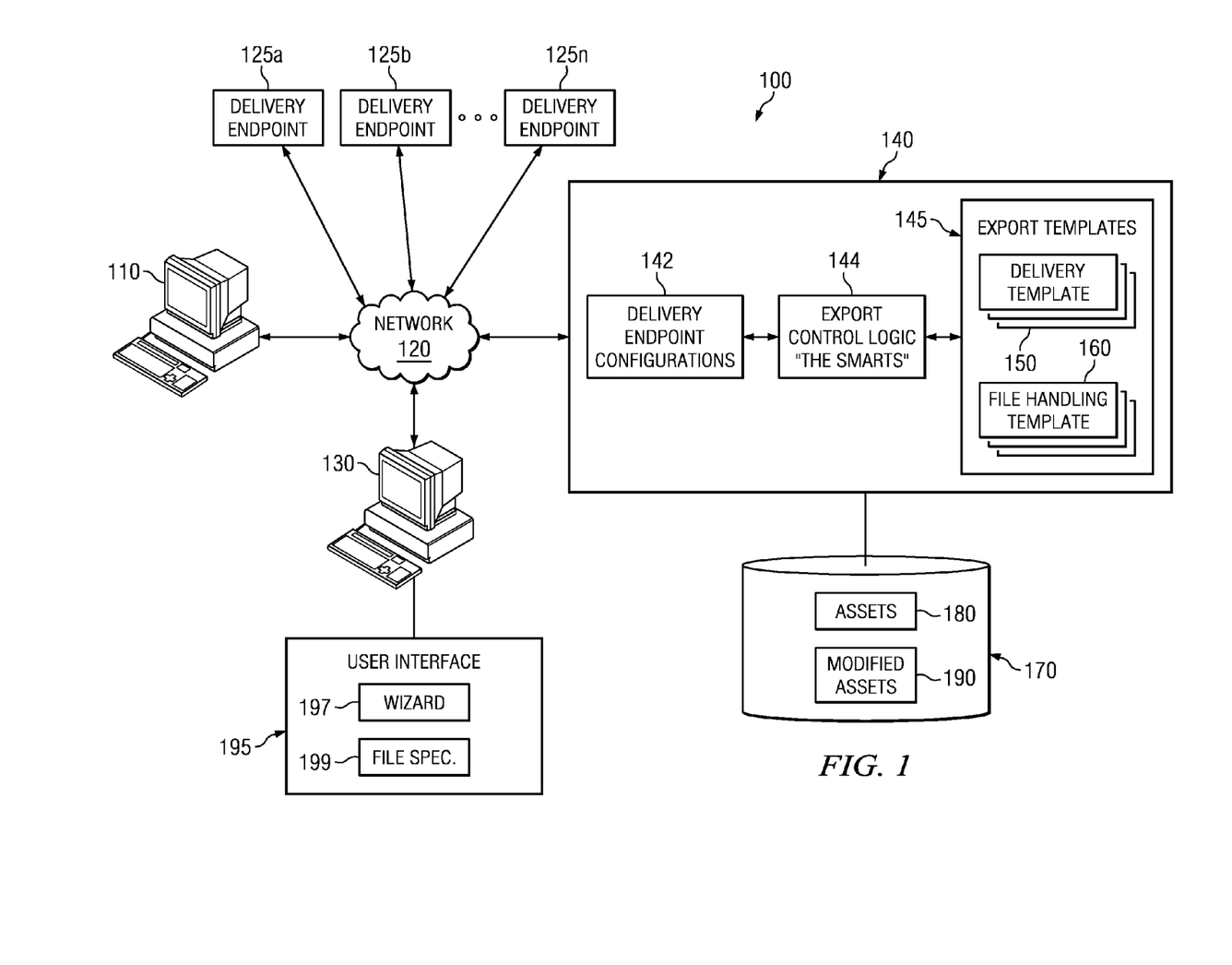
FIG. 1 depicts a diagrammatic representation of a hardware architecture where embodiments disclosed herein can be implemented, illustrating a system and method for templated export of content.

Before discussing embodiments of the invention, a hardware architecture where embodiments disclosed herein can be implemented is described with reference to FIG. 1. In FIG. 1, system 100 may comprise user devices 110, 130, network 120, export system 140, and deliver endpoints 125a-n.

Network 120 may represent an external or public network communicatively connected to export system 140. The internet might be an example of an external or public network and a company's intranet might be an example of an internal or private network where export system 140 resides. Network 120 can be bi-directionally coupled to a variety of networked systems, devices, repositories, etc. User devices 110, 130 may be communicatively connected to export system 140 via network 120 and may be configured to communicate with export system 140 over a secure connection such as a private virtual network (VPN) connection. Export system 140 may be configured to communication with deliver endpoints 125a-n over various communications channels, including secured and non-secured network connections as known to those skilled in the art.

In the configuration as shown in FIG. 1, delivery endpoints 125a-n may represent content distribution channels and/or websites, each having a set of different, distinct or unique requirements or parameters as to how content should be prepared, processed and/or packaged for publication through their channel or website.

For example, delivery endpoints 125a-n may comprise Amazon.com®, iTunes®, YouTube®, etc. (Amazon.com®, iTunes®, YouTube® are registered trademarks associated with Amazon, Apple, and Google, respectively). As such, delivery endpoint 125a may be a book publisher such as Random House that publishes thousands of book titles to ecommerce systems and/or distribution channels (e.g., Amazon, Barnes and Noble, etc.) each week. This requires that the images for the book jackets along with the metadata about the book titles, descriptions, reviews, etc. are all packaged up and delivered to these systems.

Export system 140 may comprise delivery endpoint configurations 142 corresponding to the content processing and/or packaging requirements for each of delivery endpoints 125a-n. Export system 140 may further comprise control logic 144 to process assets based on the processing/packaging requirements for the delivery endpoints, and export templates 145 associated with particular delivery endpoints 125a-n representing the processing/packaging requirements for the assets.

The term "asset" may refer to a file that is stored in a digital format and that is detailed by its metadata. This kind of metadata is referred to herein as file metadata. File metadata may describe, for example, what a file contains, how to encode/decode the file, from where the file is originated, who owns the file, who can access the file, and so on.

Example embodiments may utilize export templates to simplify an export process of digital assets. In at least one embodiment, the simplification of an export template may bring common functions together and offer templating of export parameters and control of business logic driving what a user can accomplish via exporting assets. An Export User Interface (UI) may utilize templates based on a user specifying a delivery endpoint, assets, and/or specific file preparation parameters.

Once a user specifies a delivery endpoint, then based on configuration of the delivery endpoint, the system may process the assets with templated parameters specifying how the files may be prepared and delivered to the delivery endpoint.

Thus, embodiments may provide advantages simplifying an export process of digital assets associated with delivery endpoints via export templates. Non-limiting example embodiments are described below.

In some embodiments, delivery endpoint configurations 142 for each of delivery endpoints 125a-n may be stored within export system 140. For example, delivery endpoint configurations 142 may store specific configurations for how the data, assets, content and/or metadata is prepared, processed or packaged, and how the files are delivered to each delivery endpoint 125a-n.

In some embodiments, each of export templates 145 may be associated with delivery endpoint configurations 142 for a respective delivery endpoint 125a. Further, export control logic 144 may utilize delivery parameters specified in an export template 145 to process, transform or modify an asset to be delivered to a delivery endpoint 125a-n. More so, each export template 145 may include at least one delivery template 150 and/or at least one a file handling template 160. Delivery template 150 may include parameters identifying delivery rules and procedures for delivery of an asset, and file handling template 160 may include required or desired parameters for an asset.

More specifically, delivery template 150 may include parameters related to how and when assets may be communicated to a particular delivery endpoint 125a. In an embodiment, a delivery parameter may specify that the delivery is to be done via upload, download, email, FTP (File Transfer Protocol), and/or file transfer to a local file system (local to the specified delivery endpoint, in this example, delivery endpoint 125a).

Delivery template 150 may include additional information pertaining to the specified delivery endpoint. For example, if a delivery parameter is set to download, the template may include a parameter indicating a file name of a zip file. If no file name is provided, the assets may be delivered in a zip with the file titled "<user id>-<date>-<timestamp>.zip", e.g. "jsmith-19 May20009-1630 PM.zip."

If a delivery parameter is set to FTP, the parameter may specify an FTP server address (including a designated port of the FTP server), an FTP account, password, and/or a directory path on an FTP server where assets may be copied.

If a delivery parameter is set to email, delivery template 150 may contain an email preset parameter. This parameter may specify a list of email addresses to which the files may be emailed. If this parameter is not included in delivery template 150, and a delivery parameter is set to email, then export system 140 may be configured to present an error to the user. In an embodiment, an email subject parameter designates a subject of an email being sent if a delivery parameter is set to email. If a delivery method is set to email and a delivery subject parameter is not included, a default email subject parameter may be used. For example, a subject parameter may default to "Delivery of media from Open Text media manager." In an embodiment, an email message parameter may designate the message of the email being sent if the delivery method parameter is set to email. In an embodiment, a message may include attachments of the content files. In an embodiment, if a delivery method is email, and the message parameter is not included, a default message may be used. For example, "The attached media files are being delivered to you via Open text Media Manager. \n Regards, <sender's name>."

In some embodiments, file handling template 160 may include parameters associated with what content type conversions may be desired or required for an asset, design specifications of content files of XML, if the asset(s) should be compressed, or otherwise prepared for a particular delivery endpoint. Further, file handling parameters may also include a list of what metadata to include for each template 145. Non-limiting examples of such metadata may include duration, title, actors, rights, etc. File handling parameters may include the format that the metadata should be sent in. Non-limiting examples of such a format may include XML, Excel, CSV, etc. File handling parameters can contain what format the content should be sent in. Non-limiting examples file handling parameter formats may include videos in QuickTime or Windows Media, or photos in various formats such as Photoshop, .EPS, .GIF, .PNG, etc. File handling parameters can include whether all the files should be in a single folder or spread across a hierarchy of folders, whether the files should be zipped up in a single file, whether related files should be sent, whether an email should be sent to someone to let them know the content was shipped, whether the content should be delivered to one location and the metadata to another, and even whether the content files should be included or not. For example, perhaps only metadata should be included for a particular content file.

In some embodiments, a template export utility or tool may be provided by export system 140 to users at user devices 110, 130 via a graphical user interface 195. The template export utility or tool may comprise wizard 197 and/or file specifications 199. In one embodiment, wizard 197 may be configured to display an export template 145. In one embodiment, file specifications 199 may allow a user to modify or determine file specifications for file handling parameters for an asset. Particularly, if a template does not have a standard file handling template, wizard 197 may operate to present a file specification page to a user on UI 195 so the user may determine file handling parameters for delivery endpoint 125a. To this end, file handling parameters for assets may be determined and associated with a particular delivery endpoint 125a.

In one embodiment, if delivery endpoint 125a does not include file handling parameters, wizard 197 may allow the user to manually determine file handling parameters. For example, suppose delivery endpoint 125a may represent a music and video publisher. If a user specifies delivery endpoint 125a, then export system 140, based on an export template 145 associated with delivery endpoint 125a may determine how to prepare a music video that may be sent to delivery endpoint 125a. In some embodiments, the music video has been approved for distribution (for instance, by a marketing director of an entity operating export system 140) and is stored in repository 170 accessible by export system 140. The user may simply direct export system 140 to where the music video is stored and export system 140 may proceed to automatically process and prepare the music video for delivery endpoint 125a.

In one embodiment, all digital assets 180 ready for distribution to delivery endpoint 125a-n may be stored in repository 170. If delivery endpoint 125a has an associated file handling template 160 or a user may manually set file specifications 199 that process, transform or modify an asset 180, a processed transformed or modified asset 190 may be stored within repository 170.

As such, a user at user device 130 may only need to indicate which assets are desired to export to a delivery endpoint 125a. Export system 140 can process the assets for export based on file parameters and/or delivery parameters for each asset utilizing export template 145 associated with delivery endpoint 125a without further input from the user. Accordingly, a user at user device 130 may not configure delivery template 150 and/or file handling template 160. Yet, in another embodiment, the delivery parameters and/or file handling parameters may be optionally determined by users utilizing export system 140 to specify file handling parameters and/or delivery parameters for an export.

In one example of a templated export, a user may wish to export music video productions to a delivery endpoint 125a. In addition to packaging requirements, delivery endpoint 125a may require all uploads be free of any licensed music. In this case, export template 145 for delivery endpoint 125a may allow the user to export all the music video files to delivery endpoint 125a except the one(s) containing licensed music. In one embodiment, this is achieved by utilizing metadata that describes the content, including licensing information.

Figure 2:
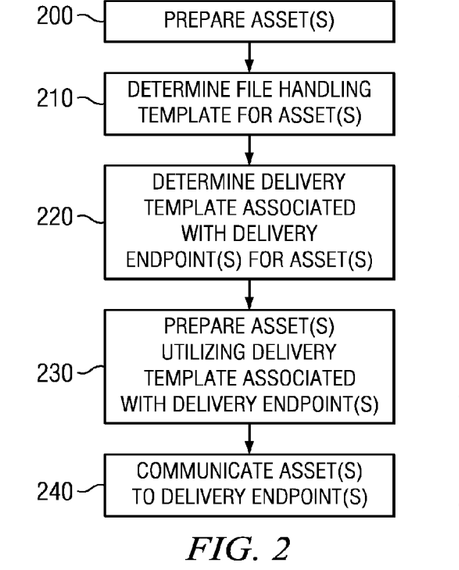
FIG. 2 depicts a flow diagram illustrating an example of one embodiment of a method for a templated export.

FIG. 2 depicts a flow diagram according to one example embodiment for a templated export.

In one embodiment, the template export process may be structured for a user to drive file handling parameters within a template via a UI. In one embodiment, at least one asset may be prepared for a delivery endpoint (step 200). The method may further include determining a file handling template for at least one delivery endpoint (step 210). For example, file handling template may be selected in a graphical user interface of a user device, and file handling template may include file related parameters for at least one asset. Fields of a file handling template for at least one asset that are not already filled may then be filled by a user. Accordingly, in one embodiment, a user may manually define file handling parameters.

The method may further comprise determining a delivery template associated with at least one delivery endpoint (step 220). In one embodiment, the delivery template may be selected by export system 140 based on a delivery endpoint indicated by a user via a graphical user interface of a user device. The delivery template thus determined may include delivery related parameters associated with the particular delivery endpoint. Where the user has indicated more than one delivery endpoints, export system 140 may determine appropriately one or more delivery templates. In one embodiment, a single delivery template may be associated with one or more delivery endpoints. In one embodiment, each delivery endpoint is associated with a single delivery template.

In one embodiment, the method may include preparing an asset or a set of assets for delivery utilizing a delivery template associated with a particular delivery endpoint (step 230). Then, the asset or assets may be communicated to the delivery endpoint utilizing the parameters now associated with the asset or assets through the file handling template and delivery template (step 240).

The above steps may be performed in various ordering, or include different steps and processes. For example, the following are other embodiments that may be utilized by a user desiring to export an asset to a delivery endpoint utilizing an export system.

In one example embodiment, export system 140 may receive a selection of multiple assets to be communicated to a delivery endpoint 125*a*, determine a file handling template 160 based on the selection of assets, determine a delivery template based on delivery endpoint 125*a*, and communicate the assets to delivery endpoint 125*a*.

In another embodiment, export system may receive multiple assets to be communicated to a delivery endpoint 125*a*, determine a file handling template 150, and determine a delivery template 160. Then, a user may edit the delivery parameters and/or the file handling parameters within file handling template 160 and/or delivery template 150, for example via file specifications 199. Then, export system 140 may communicate the assets to delivery endpoint 125*a*.

In another embodiment, export system 140 may receive multiple assets to be communicated to a delivery endpoint 125*a*, receive a transformed image type, and push the transformation to all assets of the image type (etc for other content types). Then, export system 140 may specify to export the renditions of a single asset in the set, as well as other specific export parameters.

In at least one embodiment, export system 140 may provide a configurable workflow associated with export functions in UI 195. This may enable an administrator to configure processes executed if a user attempts to export assets from UI 195 to a delivery endpoint 125*a* via export system 140.

In one example embodiment, export system 140 may be configured to request or require user approval for a templated export. In this embodiment, an option may be presented on UI 195 for an administrator to modify a process including additional procedures and steps controlling if the templated export is to be processed. Export system 140 may receive at least one asset or file to export to delivery endpoint 125*a*. Export system 140 may receive delivery parameters and file handling parameters, or manually for a delivery endpoint. Prior to processing the export, export system 140 may send a request to an approver, such as a system administrator. An approver may then receive the request in an associated inbox and either approves the request and the export process continues to execute, or reject the request. If the administrator rejects the request, the export process may be aborted and a notice may be sent to the user.

In an embodiment, export system 140 may provide a configurable workflow associated with the exported template to UI 195. This may enable an administrator to configure which one of the above mentioned embodiments, may be executed if a user attempts to an export an asset using UI 195. Further embodiments, may provide a workflow implementing a standard export process utilizing export system 140, while other embodiments may provide a standard export workflow that may be modifiable by an administrator.

In an embodiment for initiating an export by a user, all references in UI 195 to an export action can use a name for an export that has been configured on export system 140. In some embodiments, an administrator may desire to use identifiers or names such as "publish," "package assets," or "deliver assets." In some embodiments, the naming of an export may be addressed via localization files, but every instance of an "export" may be able to be converted to another term. Export system 140 may allow a user to select one or more assets and/or asset containers, and initiate an export to delivery endpoint 125*a*. If a user has selected users in addition to the asset and/or asset containers, export system 140 may proceed with the export, filter out users, and post a message alerting a user that the user cannot export users. The user may have the choice of processing with the users, or cancelling the export process.

In another embodiment, UI 195 may enable the user to specify how the assets/files may be prepared for delivery, such as via file specifications 199. Accordingly, the user may utilize export templates 145 along with user selections of parameters within UI 195 for an export process. Export system 140 may collect file specifications 199 determined by the user before taking action relating with the content files/assets related to the exports. In other embodiments, the export process may also limit, reduce, or remove delays in the export process that force the user to wait in order for a further action.

In an embodiment, a user may cancel the export operation at any point prior to completing the export, and return to a main view prior to the export operation was initialized. In an embodiment, after the user has specified the export parameters within a template, the user may click to submit the export, and UI 195 may close. At that point, a notice may be provided to the user to indicate that the export process has been successfully added to a job center within export system 140. For example, the notice may be provided with an email address associated with the export.

In an embodiment, if there are export parameters that are required, but the user has not provided these when an export is submitted, then export system 140 may communicate an alert message indicate what data is missing, and instruct the user to complete these parameters and re-submit the export. If the export spans multiple pages of a wizard 197, then this feedback may be provided within the context of each page of wizard 197, not allowing the user to proceed further if required parameters are not provided.

In an embodiment, UI 195 may provide an option allowing a user to repeat an export, with parameters specified in the export being pre-populated in UI 195 on a subsequent execution of an export. Accordingly, a user may change export parameters, for a repeated export and resubmit the export. If repeating the export, any change made to a specific parameter may result in other parameters that are dependent on that parameter being appropriately cleared. Further, if dependencies between parameters exist, the change to one parameter may cause the other parameter to be cleared.

Figure 3:
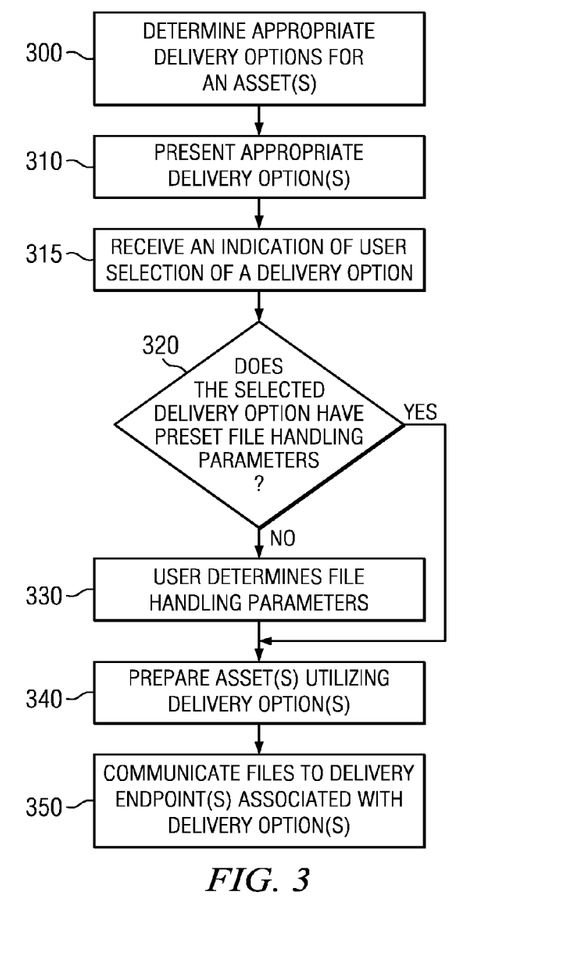
FIG. 3 depicts a flow diagram illustrating an example of one embodiment of a method for a templated export.

FIG. 3 depicts a flow diagram according to one example embodiment for a templated export.

A system may determine appropriate template that may be made available to a user for an asset (300). For example, based on selection of an asset type, such as a video, a system may indicate a template for each delivery endpoint configured to receive video files. A system may then present the appropriate template for the asset to a user on a graphical user interface (310). In one embodiment, the actual template may not be presented to the user. Rather, the system may present a set of delivery options with associated parameters already populated. In this way, the complexity of the template may be hidden or otherwise transparent to the user.

A system may then receive an indication of a user selecting a delivery option for the asset (315). Then, the system may determine if the selected delivery option is associated with a file handing template having certain file handling parameters (320). More specifically, the system may determine if file related parameters associated with a delivery endpoint are defined within a template, or if the template for the delivery endpoint does not dictate file handling parameters, such that a user may manually define the file handling preparations for the template. If the template does not include file handling parameters, the system may prompt the user to provide file handling parameters for the delivery endpoint (330).

Further, the system may prepare the asset according to the file handling parameters (340). Again, as discussed above, the file handling parameters can be from the template or provided by a user. The prepared assets can then be communicated to the specified delivery endpoint without requiring any further user input (350).

Figure 4:
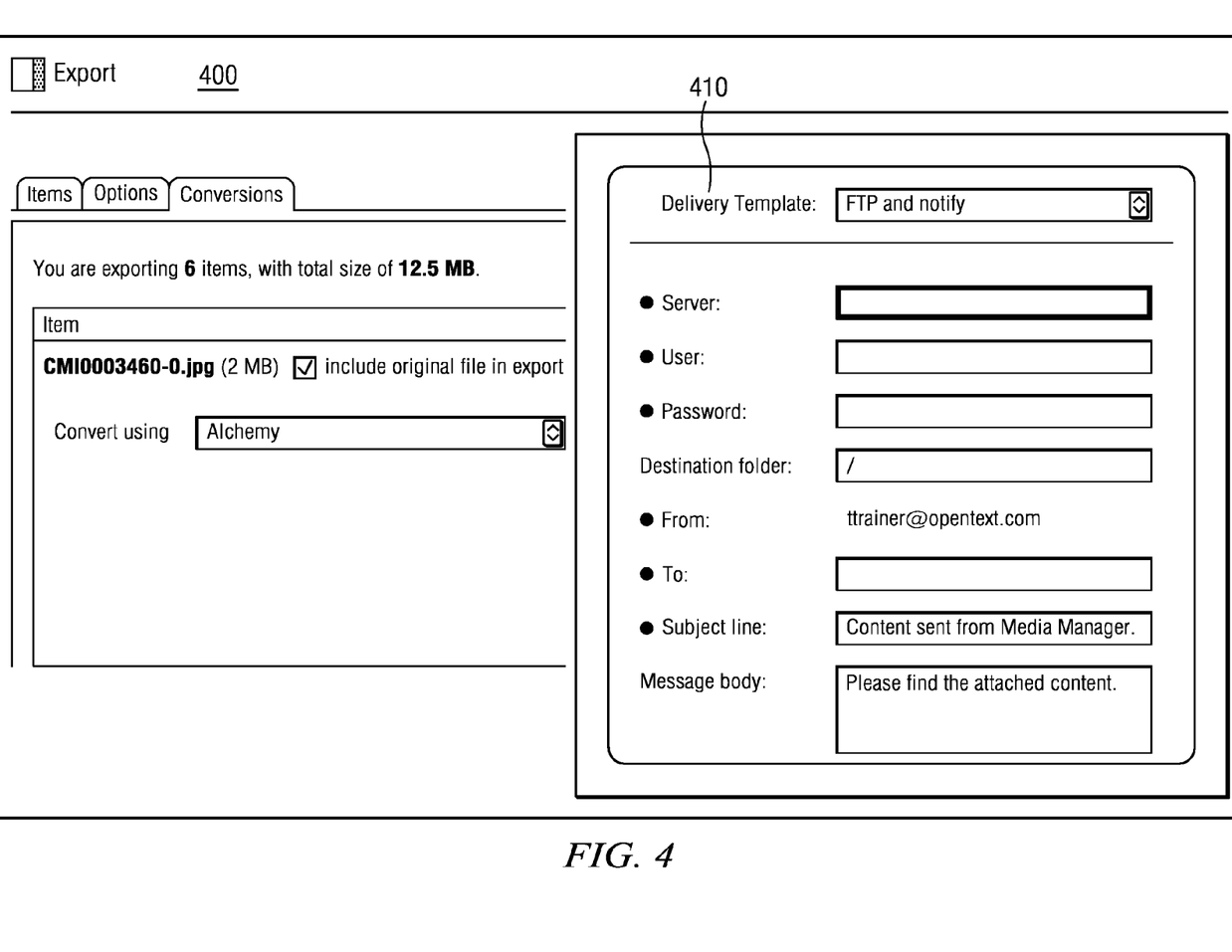
FIG. 4 depicts an example of one embodiment of a user interface showing a templated export in progress.

FIG. 4 depicts a diagrammatical representation of a user interface implementing one example of export template 400. In this example, delivery template 410 indicates that the delivery method parameter is set to FTP. Further, parameters may specify the FTP server address (including port), the FTP account, password, the directory path on the FTP server where the files can be copied, a sender, a receiver, the subject of the delivery, and a message body for the delivery. The parameters for delivery template 410 may be set by an administrator based on a particular delivery endpoint. As discussed above, in some embodiments, delivery template 410 may be transparent to end users and therefore cannot be viewed on a user device.

Returning to delivery template 150 within the export template 145, in some embodiments, delivery template 150 may be utilized via UI 195 as well as having default values set in export system 140. In some embodiments, delivery parameters may be configured in delivery template 150 via export system 140 for data delivery. In an embodiment, export system 140 may provide an extensible configuration or API allowing an authorized user or administrator to form business rules to determine which delivery parameters may be made available to end users based upon the particular assets and/or folders included in an export. In an embodiment, usage of delivery template 160 may be configurable via a user group, and configurations may allow an administrator to control which user groups can use which delivery parameters. In an embodiment, if a given user is not permitted to utilize a specific delivery parameters or delivery template 150, then that user may not even be aware that the parameter or template exists in export system 140. In an embodiment, delivery parameters for delivery template 150 that are not made available to a user due to rules and criteria that filter the delivery parameter from usage based on assets in the export, may be shown in UI 195 but disabled, i.e. not selectable.

In an embodiment, each parameter in delivery template 150 may be configurable via the UI 195. In an embodiment, each parameter within delivery template 150 may carry a default value, which is the value given the parameter by delivery template 150. Further, the behavior of the parameter may be visible or hidden (whether the parameter appears in UI 195), require or not required (whether the parameter may be provided before the export may be executed), editable or not edible (whether the user is able to edit this parameter, if the parameter is not editable, then the template may carry a default value if the field is required) or and edit type. More specifically, in an embodiment a type of widget may be used in presenting fields to users, such as a text field, text area, password text or a combo box.

In an embodiment, if delivery template 150 includes delivery parameters, the delivery may be an all-in-one delivery, i.e., all assets being delivered to the same delivery endpoint 125a, unless a two-part delivery is configured. In an embodiment, the export system 140 may maintain the delivery parameters as a preference. As such, each time a user enters a new export process, export system 140 may set the delivery parameters to a same value as a previous export, including keyed-in parameters. For example, if a user chooses to export via email, provides email addresses, a subject and a message, export system may configure the same email address, subject and message to be shown when the next user utilizes export system 140.

The following are example embodiments of parameters that may be within file handling template 160 that may be applied per file/asset in an export. More so, the following file handling parameters may be determined or adjusted via a user in file specifications 199, or the parameters may be fixed or be non-editable, or even non-viewable, to a user.

For example, a latest version parameter may specify that a designed asset included in the export be the most recent version of the asset. In some embodiments, a renditions parameter may specify what rendition files are included in the export. In some embodiments, a default value may be selected for the renditions parameter. In an embodiment, if export system 140 applies the renditions parameter, if a rendition type that is specified in the file handling template 160 does not exist for the asset in export system 140, then the rendition type may be ignored.

In an embodiment, a conversion parameter may be a structure of a parameter that is associated with a given content type for one or more conversions of asset 190 and/or an option to include or exclude an original file 180. In other words, any asset of a designated content type may receive a corresponding conversion and may be set to include or exclude an original asset or file 180.

File handling templates 160 may allow an administrator to configure how the files are prepared within export system 140. In an embodiment, a user may not be aware of a file handling template 160 while delivering an asset. As such, the parameters associated with file handling template 160 may be executed behind the scenes if an export template 145 includes a file handling template 160. For example, a user may simply selects export template 145 with file handling template 160 for an asset to be delivered to a delivery endpoint, and file handling template 160 may be executed in order to prepare the asset/files.

The parameters within a file handling template 160 may include file/asset specifications that apply to the export, rather than the files/assets themselves, and may be specified once in file handling template 160. For example, in one embodiment a content parameter may designate whether to export content files and a list of those files, such as an export manifest, content files and metadata, or the metadata for all the content files. In one embodiment, file handling template 160 may include a default selection for the content parameter. In one embodiment, a zip parameter may specify whether to compress all files/assets into a zip file or not. In some embodiments, by default, a zip file may be titles such as "<user id>-<date>-<timestamp>.zip, e.g. "jsmith-19 May2009-1630 Pm.zip." Other embodiments, may allow for an optional specification of a file name for the zip file. In an embodiment, a linked asset link type parameter may include a list of link type to be included in the export, no link types, or all link types. Further, there may be a default selection of the linked asset link type parameter, such as no link types. In an embodiment a linked asset link level parameter may indicate a number of levels to follow links, such as 1, 2, 3, 4 or all link levels. In an embodiment, this parameter may have a default, but may have no effect if the linked asset link types parameter has no link types. In an embodiment, a post process parameter may specify the name of a post process option to apply to the assets/files of an export. In an embodiment, this parameter may have a default.

The following embodiments are embodiments that may be displayed or configured in UI 195 utilizing export system 140. As such, the following configurations may utilize parameters within export template 145.

Export system 140 via UI 195 may provide a list of all assets when an export was initiated. This may include any assets that are contained by asset containers that are included in the export. The asset containers themselves may be represented in UI 195.

In some embodiments, per asset security requirements, export system 140 may have export permission to all assets and asset containers displayed in UI 195. The assets may be displayed in UI 195 by an asset thumbnail, asset filename, content type, and/or the file size. In other embodiments, asset containers may be displayed, the content type may be "folder" and the file size may be excluded. Further, assets and asset containers in export system 140 may be storable by content type of filename.

In an embodiment, export system 140 may allow a user to remove any asset from a list of assets to be exported. If doing so, export system 140 may also remove any conversions, modifications or transformations associated with the asset in repository 170. If export system 140 removes a folder from the list of assets being exported, the assets and the subfolders may also be removed, and a dialogue may be displayed on UI 195 informing a user that all assets and subfolders may also be removed. Accordingly, a user may be able to cancel or continue the removal action.

In some embodiments, export system 140 may provide a control allowing a user to designate that the most recent version of an asset be exported. Making a selection of the most recent version of an asset may not affect the assets displayed in UI 195, nor the thumbnail or file name. This parameter may be set by export system 140 via UI 195 if an asset included in the export is not the most recent version of the asset. In some embodiments, UI 195 may allow a user to add any specific asset renditions to the list of export files. In some embodiments, this parameter may include a list of rendition types, e.g. thumbnail, preview, pdf preview, FPO or custom types. Renditions may also be export as is, with no options to transform them.

The following are example embodiments of parameters that may be applied by export system 140 to an entire export within UI 195. In an embodiment, export system 140 may provide that a user designate to export content files and lists of those files (for example, in an export manifest), content files and all metadata, or the metadata for all the content files. A default selection for this parameter may match a selection the last time the user transacted an Export. Export system 140 may provide a configuration establishing additional metadata fields that may be added to the metadata, and what metadata fields may be excluded from the metadata, on a per-model basis.

In some embodiments, export system 140 may provide a user with a choice to compress all files in a ZIP file. If the user opts to do so, export system 140 may provide a control within which the user may enter the name of the zip file or a default string title may be used. In some embodiments, export system 140 may provide control via which the user may opt to include linked assets, and the user may specify one or more link types and the number of link levels to traverse.

In an embodiment, if export system 140 is configured to include any processes that may be applied across all the fields at the time of the export, then export system 140 may provide a list of these and allow a user to select one from the list. This may be used for processing all the files/assets of an export, example include "create power point" or "change filenames to match XYZ spec," etc. Post process options may be displayed according to the relevant content types. In an embodiment, export system 140 may provide a control that is enabled if there are asset containers selected to be included in the export, which allow a user to specify whether or not sub-asset containers can be included in the export.

In some embodiments, export system 140 may enable an administrator or authorized user to configure exports such that a metadata file is processed and delivered separately from the content file processing and delivery. A two-part delivery may display controls in UI 195 based on the associated delivery templates 160.

In some embodiments, metadata and content files may be delivered by export system 140 to delivery endpoint 125a via FTP or file system. The delivery parameters may be defined by an administrator or authorized user. In other embodiments regarding a two-part delivery, file parameters may not be displayed and may utilize file handling template 160 for processing the metadata and content files.

In an embodiment, export system 140 may provide a non-edible summary of the export to include a list of all files, file sizes, a count of the files and a total file size, and the delivery information. If a user completes all selections in the UI 195 and clicks to submit the export job, if there are no data validation issues, the export process may be run by export system 140 asynchronously and may be tracked by the user. If the export fails, this may be noted in export system 140, and a user may be given the option to take an action. For example, a user may rerun the export that may bring forth the same parameters specified as they were when the user first submitted the export job. If the export succeeds this may be noted by export system 140 and a user may be notified by an alert from export system 140 via UI 195 that the export was completed successfully.

Further, the contents of an export manifest and the asset metadata may be extended to reflect the hierarchical structure of folders. If folders are included in an export, then the hierarchical structure of the folders, sub-folders and assets may be presented as a new section in the export manifest or asset metadata. The metadata included in the export asset metadata file may be configurable. Export manger 140 may include a configuration of what fields in each model may be included in exported asset metadata.

In an embodiment, an export action may not be made available on an asset or asset container that is deleted, but not purged, if a selection of assets and/or asset containers include one or more deleted items, the export may proceed, and export system 140 may exclude the deleted items from the export and notify the user about the deleted items. An export action may be made available on an asset that is partially deleted, whether purged or not, the export of such assets may include metadata and not the content file.

In an embodiment, export system 140 may not allow a user that does not have export security permission for at least one of the selected assets to initiate the export of the assets. If a user has selected multiple assets, and the user has export permission on a subset of those assets, export system 140 may proceed with the export, filter the assets for which the user does not have export permission, and post a message alerting the user that the user cannot export all of the assets because of a lack of security permissions. A user may then have a choice of proceeding without exporting all the assets, or cancelling the export process. If a user attempts to export an asset container hierarchy, and has the export permission on the top most asset container but not on all sub-containers, then the export can proceed, but all sub-containers for which the user does not have export permission, and the asset and sub-containers within them, may be excluded from the export and export system 140 may communicate a message alerting the user that the user cannot export all the assets and asset containers because of a lack of security permissions.

According to embodiments disclosed herein, delivery parameters and file handling parameters may be defined in a single export template. This frees a user from having to make all of these selections, which can be especially important when the user does this operation every day. A template export as described above can therefore significantly reduce the time and efforts needed in content delivery down to only a couple of clicks, even though behind the scene there is a whole workflow of operations caused by an export template being selected for a particular delivery endpoint.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.).

Alternatively, the computer-executable instructions may be stored as software code components on a DASD array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A templated export method, comprising:
a first computer initiating an export job responsive to a first user action at a second computer, the second computer being communicatively connected to the first computer over a network connection, the first user action indicating a first delivery endpoint, the initiating the export job comprising determining a first export template for the first delivery endpoint, the first export template comprising at least one delivery parameter defining how and when a delivery is to occur and at least one file handling parameter particular to the first delivery endpoint;
the first computer preparing an asset for delivery to the first delivery endpoint utilizing the at least one file handling parameter particular to the first delivery endpoint; and
the first computer communicating the asset to the first delivery endpoint based at least in part on the at least one delivery parameter particular to the first delivery endpoint without any further user input.

2. The method of claim 1, wherein the export template is determined from a plurality of export templates based on predetermined delivery endpoint configurations, each of the plurality of export templates corresponding to one of a plurality of delivery endpoints.

3. The method of claim 1, wherein the first export template comprises a file handling template and a delivery template.

4. The method of claim 3, wherein the file handling template comprises file handling parameters particular to the first delivery endpoint.

5. The method of claim 1, wherein the asset is prepared for delivery to the first delivery endpoint without any user input.

6. The method of claim 1, further comprising:
providing a tracking function to a user at the second computer for tracking a progress of the export job.

7. The method of claim 1, further comprising:
if the asset was not successfully communicated to the first delivery endpoint, presenting the delivery parameters for the first delivery endpoint to a user at the second computer; and
allowing the user to rerun the export job with the delivery parameters for the first delivery endpoint without any further user input.

8. A computer program product comprising at least one non-transitory computer-readable medium storing instructions executable by a first computer to perform:
initiating an export job responsive to a first user action at a second computer, the second computer being communicatively connected to the first computer over a network connection, the first user action indicating a first delivery endpoint, the initiating the export job comprising determining a first export template for the first delivery endpoint, the first export template comprising at least one delivery parameter defining how and when a delivery is to occur and at least one file handling parameter particular to the first delivery endpoint;
preparing an asset for delivery to the first delivery endpoint utilizing the at least one file handling parameter particular to the first delivery endpoint; and
communicating the asset to the first delivery endpoint based at least in part on the at least one delivery parameter particular to the first delivery endpoint without any further user input.

9. The computer program product of claim 8, wherein the export template is determined from a plurality of export templates based on predetermined delivery endpoint configurations, each of the plurality of export templates corresponding to one of a plurality of delivery endpoints.

10. The computer program product of claim 8, wherein the first export template comprises a file handling template and a delivery template.

11. The computer program product of claim 10, wherein the file handling template comprises file handling parameters particular to the first delivery endpoint.

12. The computer program product of claim 8, wherein the asset is prepared for delivery to the first delivery endpoint without any user input.

13. The computer program product of claim 8, wherein the instructions are further translatable by the first computer to provide a tracking function to a user at the second computer for tracking a progress of the export job.

14. The computer program product of claim 8, wherein the instructions are further translatable by the first computer to perform:
if the asset was not successfully communicated to the first delivery endpoint, presenting the delivery parameters for the first delivery endpoint to a user at the second computer; and
allowing the user to rerun the export job with the delivery parameters for the first delivery endpoint without any further user input.

15. A system, comprising:
a first computer having a processor, non-transitory computer memory, and stored instructions configured to perform:
initiating an export job responsive to a first user action at a second computer, the second computer being communicatively connected to the first computer over a network connection, the first user action indicating a first delivery endpoint, the initiating the export job comprising determining a first export template for the first delivery endpoint, the first export template comprising at least one delivery parameter defining how and when a delivery is to occur and at least one file handling parameter particular to the first delivery endpoint;
preparing an asset for delivery to the first delivery endpoint utilizing the at least one file handling parameter particular to the first delivery endpoint; and
the first computer communicating the asset to the first delivery endpoint based at least in part on the at least one delivery parameter particular to the first delivery endpoint without any further user input.

16. The system of claim 15, further comprising:
a plurality of export templates; and
predetermined delivery endpoint configurations, wherein the export template is determined from the plurality of export templates based on the predetermined delivery endpoint configurations, each of the plurality of export templates corresponding to one of a plurality of delivery endpoints.

17. The system of claim 16, further comprising:
a plurality of file handling templates; and
a plurality of delivery templates, wherein the first export template comprises one of the file handling templates and one of the delivery templates.

18. The system of claim 17, wherein each of the plurality of file handling templates comprises file handling parameters particular to one of the plurality of delivery endpoints.

19. The system of claim 15, wherein the asset is prepared for delivery to the first delivery endpoint without any user input.

20. The system of claim 15, wherein the first computer is further configured to perform:
   if the asset was not successfully communicated to the first delivery endpoint, presenting the delivery parameters for the first delivery endpoint to a user at the second computer; and
   allowing the user to rerun the export job with the delivery parameters for the first delivery endpoint without any further user input.

* * * * *